INVENTORS
SALVATORE V. MESSINEO
STANLEY Y. YOSHINO
BY
Richard D. Seibel
ATTORNEY United States Patent Office 3,549,468
Patented Dec. 22, 1970

3,549,468
HONEYCOMB STRUCTURE UTILIZING POLYBENZIMIDAZOLE RESIN TO JOIN TWO CORE SECTIONS AND TO REINFORCE THE EDGES OF THE CORES
Salvatore V. Messineo, Hawthorne, and Stanley Y. Yoshino, Monterey Park, Calif., assignors to North American Rockwell Corporation, a corporation of Delaware
Filed Feb. 28, 1967, Ser. No. 619,479
Int. Cl. B32b 3/12
U.S. Cl. 161—68                                1 Claim

ABSTRACT OF THE DISCLOSURE

Compositions for use in filling the edges and splicing honeycomb core for high temperatures are described. The compositions comprise a polybenzimidazole resin plus aluminum powder, arsenic thioarsenate, glass mill fibers and either colloidal silica or hollow glass microspheres. A solvent for making a viscous cohesive paste is employed in preparing the composition. Upon heat curing the solvent is removed. The compositions are particularly useful with beryllium structures.

BACKGROUND

Honeycomb sandwich structures have been widely employed in aircraft structures in order to obtain light weight and retain good structural properties. As the flight speed of aircraft increases the temperature ranges involved also increase and more advanced structural materials are required. A good light weight material for elevated temperature use comprises beryllium, or high beryllium alloys. Beryllium is attractive because of its very high specific stiffness, that is, elastic modulus over density ratio, as compared with other available structural materials. The specific stiffness advantage extends over a substantial temperature range. In addition, the specific strength, that is, the ultimate strength over the density, is also superior to other structural materials up to at least 800° F.

Despite the structural advantages of employing beryllium, very little use has been made thereof because of the difficulty of welding or mechanically joining beryllium articles. Of standard joining methods, adhesive bonding appears to be most satisfactory for fabricating beryllium.

In forming honeycomb structures some means must often be provided at the edges of panels for preventing damage to honeycomb core between facing sheets. No materials compatible with the temperature range of utility of beryllium have been available for protecting the edges of honeycomb cores. Similarly, in praparing honeycomb structures it is often found that sections of honeycomb core must be butted together between the facing sheets; and when this is required, a splicing between the honeycomb core sections is desirable for maximum strength. No suitable splicing materials have been available for elevated temperature.

BRIEF SUMMARY OF THE INVENTION

According to a preferred embodiment there is provided a polybenzimidizole resin in an organic solvent with short high strength fibers and low density particles added thereto to form a viscous cohesive paste. In a particularly preferred embodiment 100 parts by weight of resin are dissolved in from 65 to 100 parts by weight of solvent. The solution is mixed with from about 10 to 50 parts by weight of arsenic thioarsenate, from about 50 to 150 parts by weight of aluminum powder, from about 35 to 60 parts by weight of short glass fibers, and from about 9.5 to 10.5 parts by weight of colloidal silica. In another embodiment 100 parts by weight of resin are dissolved in from about 85 to 110 parts by weight of solvent and mixed with from about 10 to 50 parts by weight of arsenic thioarsenate, from about 50 to 150 parts by weight of aluminum powder, from about 15 to 25 parts by weight of short glass fibers, and from about 20 to 30 parts by weight of hollow glass microspheres. The solvent is evaporated upon heat curing and a rigid structure is produced particularly useful in high temperature honeycomb sandwich construction.

It is a broad object of this invention to provide viscous pasty materials curable into low density, heat resistant structures.

Other objects and many of the attendant advantages of this invention will be appreciated upon consideration of the following detailed description when considered in light of the accompanying drawings wherein.

Throughout the figures like reference numerals refer to like parts.

Figure 1:
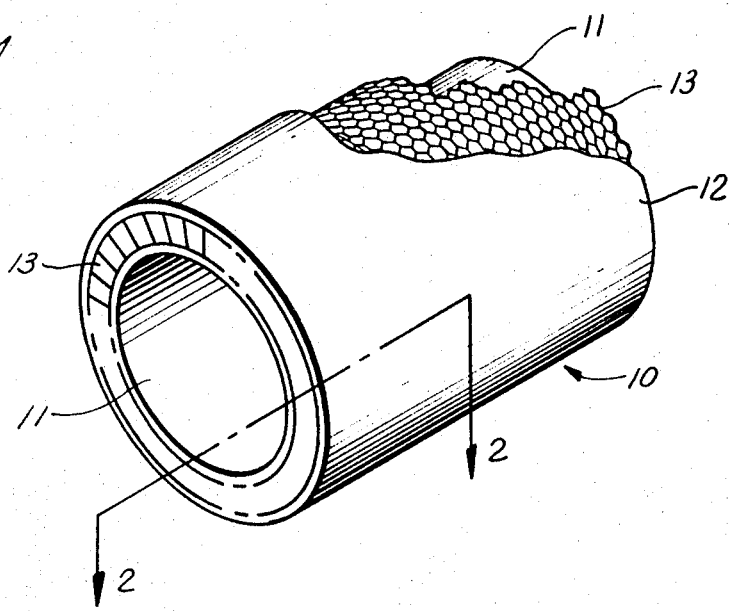
FIG. 1 illustrates in perspective-cutaway a typical honeycomb cylinder.

FIG. 1 illustrates a honeycomb cylinder constructed according to the principles of this invention. In practice of this invention according to a preferred embodiment, there is provided a cylinder 10 of honeycomb sandwich construction which comprises an inner facing sheet 11 on the interior of the cylinder. An outer facing sheet 12 is provided on the exterior of the cylinder and a honeycomb core material 13 is provided between the two facing sheets to form a structural sandwich. In a preferred embodiment the honeycomb core; which may comprise a stainless steel, brazed or adhesively bonded honeycomb; is adhesively bonded to the inner and outer face sheets 11 and 12, respectively, to form a structural sandwich. The inner and outer facing sheets 11 and 12 may comprise beryllium sheet, for example. It is found that high temperature adhesives based on polybenzimidazole resins are useful in adhesively bonding such honeycomb structures.

Figure 2:
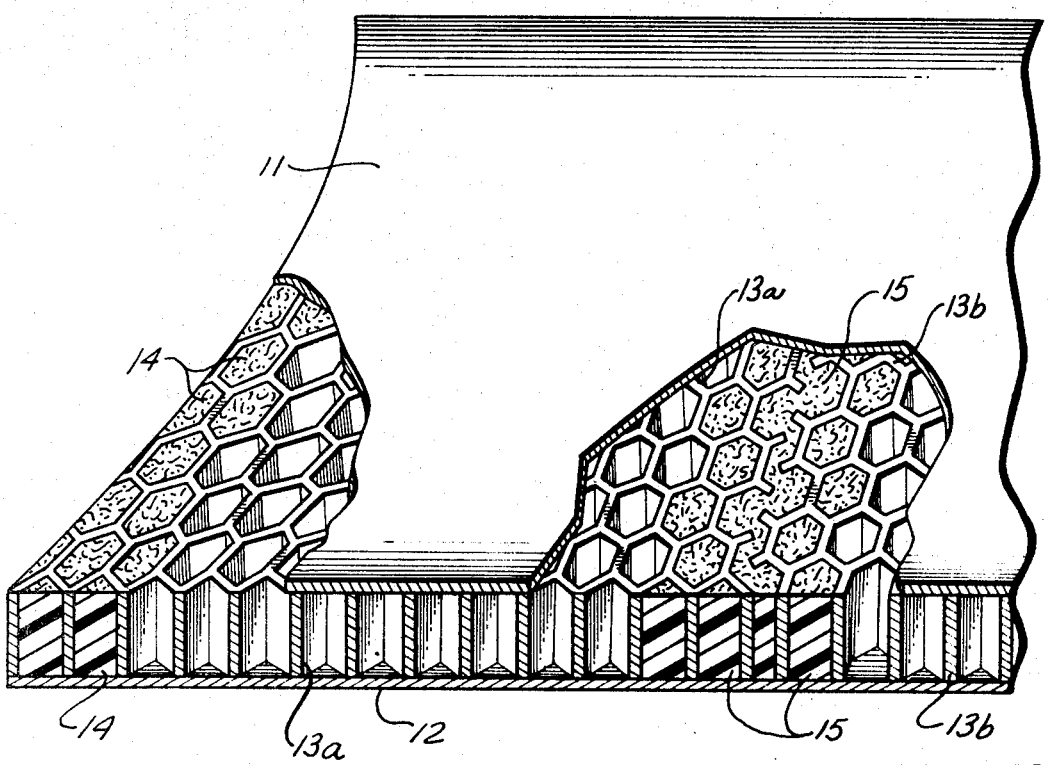
FIG. 2 illustrates a portion of such a cylinder illustrating the use of core filling and core splicing materials.

FIG. 2 illustrates in somewhat greater detail a portion of the honeycomb cylinder 10. As seen therein, a portion of the inner face sheet 11 is cut away to illustrate the edge of the honeycomb core. The honeycomb core material comprises, for example, foil gauge stainless steel sheet which may be easily damaged at the edges of the structure in handling and fabrication thereof. In order to prevent such damage the cells of honeycomb core adjacent the edge are filled with a rigid, light weight edge fill material 14 to prevent structural damage. The portions of cut cells adjacent the edge are also filled to provide a relatively smooth edge to the assembled honeycomb structure.

Also illustrated in FIG. 2 are two sections of honeycomb core 13a and 13b which are butted together to provide a continuous honeycomb core in the assemblage. Such butted joints in the honeycomb core are necessary in forming a cylinder from flat sheets of core stock or in forming very large structures due to the limited sizes of honeycomb core available. At the butted joint the cut cells of honeycomb material are filled with a core splicing material 15 having good structural strength, adhesion to the cell walls of the honeycomb, and low density. In addition to the cells cut at the butted joint intact cells adjacent the butted joint may also be partially or completely filled with the core splicing material for added strength.

It is found that plastic materials having suitable fillers for modifying the properties thereof are useful as core filling and core splicing materials. In order to accommodate the elevated temperature characteristics of beryllium face sheets and stainless steel honeycomb core, for example, it is desirable to employ a polybenzimidazole resin foundation for the plastic core edge filling and core splicing materials. Polybenzimidazole resins, however, are solid materials not readily employed for honeycomb core filling or core splicing. In general, it is desirable to employ a viscous pasty material for the core fill and core splicing materials.

It has been found in the practice of this invention that a suitable core filling material for use adjacent the edges of honeycomb core can comprise a mixture of polybenzimidazole resin, aluminum powder, arsenic thioarsenate, an organic solvent for the polybenzimidazole resin, short glass fibers and hollow spheres of glass. Similarly, a suitable core splicing material has been found to be a mixture of polybenzimidazole resin, aluminum powder, arsenic thioarsenate, an organic solvent, short glass fibers and colloidal silica.

Polybenzimidazole resins may be obtained by the condensation of bis-ortho-diaminophenyl compounds with dicarboxylic acids or derivatives thereof. Polyfunctional monomers containing an ortho-phenyl-diamino group and a carboxylic acid group may also be employed to form high molecular weight polybenzimidazoles. It is particularly preferred to employ a resin produced by reaction of diphenyl phthalate with 3,3'-diaminobenzidine. Polybenzimidazole resins suitable for use in the mixtures hereinafter described and modes of preparation are set forth in U.S. Pats. 2,895,948 and 3,174,947, for example.

Also used in the mixture is metal powder which may, for example, comprise a conventional aluminum powder such as is available from Metals Disintegrating Co. under the designation MD-105. This comprises a 1 to 5 micron aluminum powder of very low flakiness. Another suitable powder is available from Reynolds Aluminum Company under the designation 4-591 Litho Powder. Such a material is also a low flakiness aluminum powder which is readily dispersed in resin solutions. The average particle size is in the order of about 40 micro-inches as indicated by about eleven percent retention on a number 325 screen (44 microinch).

The metal powder lends structural strength to the resin at low temperatures and assists in making a viscous paste. However, the principal function of the aluminum powder is to minimize oxidation of the polybenzimidazole resin at elevated temperature by providing a barrier to oxygen penetration. As will be apparent other metal powders can be employed with appropriate adjustments in weights employed to account for differences in density.

Arsenic thioarsenate ($AsAsS_4$) is also included in the composition to afford oxidation protection for the resin at elevated temperature. The form of the arsenic thioarsenate is not critical and any reasonably fine powder will suffice to obtain uniform distribution throughout the mixture.

Since the polybenzimidazole resin is a solid material it is necessary to employ an organic solvent for making a viscous paste for application prior to curing. It has been found that suitable solvents for the polybenzimidazole resins include pyridine, dimethyl sulfoxide, N,N-dimethyl formamide or N-methyl,2,pyrrolidone, and closely related compounds thereto. Both pyridine and dimethyl sulfoxide are difficult to handle in practice; the former, because of its nauseating odor, and the latter because of its skin absorption. Hence, dimethyl formamide is a preferred solvent for use in practice of this invention for ease of application. Pyridine is a preferred solvent because of the higher cured strength obtained as hereinafter described. In the cured mixtures, the solvents are evaporated and only the other constituents remain.

Polybenzimidazole resin dissolved in a solvent is a relatively "thin" solution, or low viscosity solution which is not useful directly as a core filling and splicing material. Therefore, it is desirable to add either colloidal silica or glass hollow microspheres which are wetted by the solution to form a paste. The colloidal silica or hollow microspheres, provide a large amount of surface area to hold the resin solution and provide a foundation therefore prior to curing. Suitable colloidal silica is commercially available under the trademark designation Cab-O-Sil, from Cabot Corporation, Boston, Mass. Similarly, hollow glass spheres about 0.005 inch or less, in diameter, are available under the trademark Glob-O-Sil and are often known as glass micro-balloons. In lieu of the colloidal silica or hollow microspheres other fine particulate material such as perlite, powdered expanded mica, or ceramic hollow microspheres, and the like, may also be employed.

It is found, however, that a paste formed of colloidal silica or hollow microspheres with the resin solution and aluminum powder has very little cohesive strength prior to curing and crumbles and breaks readily. Therefore, short glass fibers are incorporated in the mixture to form a viscous paste having good cohesion prior to curing. Suitable glass fibers are about 1–10 microns in diameter and about one quarter inch long as are readily commercially available under the designation Mill Fibers. It will also be apparent that in lieu of the glass mill fibers that other fiberous materials such as graphite, stainless steel wool, boron, asbestos or Refrasil can be employed in the practice of this invention. Glass fibers are preferred because of the ready wetting by the resin, good strength and low density.

Since the core splicing and core filling materials are required to perform somewhat different functions, somewhat different composition ranges are preferred in the practice of this invention. Thus, for example, the core filling material for use adjacent the edges of honeycomb core, preferably comprises about 100 parts by weight of polybenzimidazole resin; from about 50 to 150 parts by weight of aluminum powder; from about 10 to 50 parts by weight arsenic thioarsenate; from about 85 to 110 parts by weight of organic solvent for the polybenzimidazole resin; from about 15 to 25 parts by weight of mill fibers; and from about 20 to 30 parts by weight of hollow glass microspheres such as Glob-O-Sil.

Similarly, it is found that a suitable core slicing material comprises about 100 parts by weight of polybenzimidazole resin; from about 50 to 150 parts by weight of aluminum; from about 10 to 50 parts by weight of arsenic thioarsenate; from about 65 to 100 parts by weight of organic solvent; from about 35 to 60 parts by weight of mill fibers; and from about 9.5 to 10.5 parts by weight of colloidal silica.

In either of these mixtures the proportion of aluminum is preferred to be about 50 to 150 parts by weight relative to 100 parts by weight of polybenzimidazole resin. If the aluminum is less than about 50 parts by weight, there is insufficient protection against oxidation afforded thereby. If the aluminum is greater than about 150 parts by weight, the density of the mixture increases and no additional oxidation protection is obtained. It is preferred that the range or arsenic thioarsenate present in the mixture be in the range of from 10 to 50 parts by weight per 100 parts by weight of polybenzimidazole resin. It is found that within this range good oxidation protection is obtained and below 10 parts by weight insufficient protection may be obtained in the highest temperature regions. Above about 50 parts by weight no additional oxidation protection is obtained and no benefit is involved in adding this relatively expensive ingredient. A suitable polybenzimidazole base material having a composition within this range of aluminum and arsenic thioarsenate is commercially available from Narmco Company under the trademark designation Imidite 2321 and is a powdered analog of the sheet adhesive described in Air Force report AFML-TR-65-136.

In making a mixture for use in filling the edges of honeycomb core materials it is preferred to employ from about 85 to 110 parts by weight of solvent, from about 15 to 25 parts by weight of short glass fibers and from about 20 to 30 parts by weight of hollow glass microspheres per 100 parts by weight of resin. The proportions of solvent, glass fibers, and glass microspheres are related and, if varied, should be varied together to maintain a suitably viscous paste. It is found that if less than about 85 parts by weight of solvent is employed that an unduly dry paste is obtained and good wetting of all of the powdered and fiberous materials is not obtained, thereby yielding relatively lower strength resultant material upon curing. In addition the paste is thick and crushing of the glass microballoons is increased. If more than about 110 parts by weight of solvent is employed, it is found that excess solvent with polybenzimidazole resin dissolved therein is extracted from the paste during use and a relatively lower strength cured composite is obtained.

If less than about 15 parts by weight of mill fibers are employed, the cohesive strength of the composite mixture prior to the curing is degraded and crumbling and breaking of the green mixture may be obtained before and during curing. When more than about 25 parts by weight of short glass fibers are employed in the mixture, the large amount of surface area thereon cannot be adequately wetted by the solvent and resin available and mixing becomes difficult so that a lowered strength cured composition may be obtained.

Similarly, if the hollow glass microspheres are present in less than about 20 parts by weight the resultant green mixture is too soft and runny for appjlication as a honeycomb core edge filling material and the cured material has an unnecessarily high density. Likewise, if the amount of glass microspheres is greater than about 30 parts by weight, there is sufficient increase in surface area to prevent wetting of all of the surfaces by the available solvent and resin and a relatively low strength cured composite is obtained. The paste is also so dry that mixing may cause crushing of the fragile microballoons.

It should be recognized that the mill fibers and the hollow glass microspheres are extremely low density, bulky materials so that the relatively small weights of these materials present in the composite mixture represents a very large volume as compared with the volume of other materials in the mixture. Because of the low densities of these materials the acceptable ranges of composition are relatively narrow; likewise, because of the high fluidity of the solvent the acceptable range of composition is also relatively narrow. It will also be appreciated that the tiny hollow glass microspheres are relatively fragile and excessive mixing in preparing the composition may break and crush an excessive number of these, thereby increasing density.

A particularly preferred composition for use in filling the edges of honeycomb core comprises about 100 parts by weight of polybenzimidazole resin, from about 90 to 110 parts by weight of aluminum powder, and about 20 parts by weight of arsenic thioarsenate. It is also preferred to employ from about 91 to 93 parts by weight of either pyridine or dimethyl formamide as a solvent. The pyridine may be preferred since the strength after curing is about 30 to 40 percent higher than with other solvents and the dimethyl formamide may be preferred despite the lower strength after curing because of the nauseating odor of pyridine. As pointed out, hereinafter the difference in strength after curing of the mixture is eliminated by a postcuring treatment so that the dimethyl formamide is a particularly preferred solvent.

It is also particularly preferred to employ about 20 parts by weight of short glass fibers (mill fibers) in the composition and about 25 parts by weight of glass micro-balloons or hollow glass microspheres as hereinabove described. It is found with this particularly preferred composition that a good viscosity cohesive paste is obtained for application by automatic equipment or by hand, and that the paste, after curing, has good structural properties for preventing damage to the edges of honeycomb core without unduly increasing the weight of parts constructed therefrom.

The core splice material prepared according to the practice of this invention has a different composition than the edge-filling material because of the different performance requirements thereof. It is found that from about 50 to 150 parts by weight of aluminum powder and from about 10 to 50 parts of arsenic thioarsenate can be advantageously employed in the core-splicing material for the same reasons in the core-filling material.

It is found, however, that because of the relatively greater difficulty of solvent removal from the core-splicing material that a somewhat lower range of solvent is preferred. Thus, for example, from about 65 to 100 parts by weight of organic solvent are preferred in the core-splicing composition. When less than about 65 parts by weight of solvent is employed, the material is relatively dry and crumbly before curing and not suitable for core-splicing application. Similarly, when more than about 100 parts by weight of solvent is employed, the paste is unduly runny and the resin solution separates therefrom upon working.

It is preferred that the short glass fibers be present in the range of from about 35 to 60 parts by weight. When less than about 35 parts by weight of glass fibers is present the material is relatively weaker in both the green and cured conditions and may not be adequately strong for a core-splicing composition. When the proportion of glass fibers is greater than about 60 parts by weight per 100 parts by weight of resin, the large surface area of this bulky, low density material prevents wetting of all of the surfaces, mixing difficulties are increased, and a relatively lower strength cured composition may be obtained.

It is preferred that the colloidal silica be present in the range of from about 9.5 to 10.5 parts by weight per hundred parts by weight polybenzimidazole resin. When the silica is present in the range of less than about 9.5 parts by weight an unduly soft paste is obtained which may be unsuitable for use in automatic equipment. When greater than about 10.5 parts by weight of colloidal silica is employed a dry and crumbly paste is obtained which also may not be suitable for use in automatic equipment. As hereinabove mentioned it should be noted that the glass fibers and the colloidal silica are very low density materials so that the weight ranges are relatively narrow and represent rather large volume differences with associated large surface area differences.

It is particularly preferred to employ a core-splicing composition comprising about 100 parts by weight of polybenzimidazole resin; from about 90 to 110 parts by weight of aluminum powder; and about 20 parts by weight of arsenic thioarsenate. The paste formed preferably comprises about 77 to 79 parts by weight of organic solvent selected from the class consisting of dimethyl formamide and pyridine, about 45 parts by weight of glass fibers, and about 10 parts by weight of colloidal silica per 100 parts of resin. It is found with such a composition that good properties are obtained for application of the core splicing material, good green strength is obtained and excellent core-splicing strength is obtained after curing and postcuring.

In preparing a composition as hereinabove described it is preferred to commence with a commercially available polybenzimidazole resin with aluminum powder and arsenic thioarsenate powder already dispersed therein such as Imidite 2321 available from Narmco Company. In the alternative the polybenzimiazole resin alone can be employed and the powdered materials added thereto. The resin is dissolved in the solvent and the aluminum and arsenic thioarsenate are dispersed therein so that uniform oxidation protection will be obtained in the cured composition. The glass mill fibers are then added and thoroughly mixed in to assure complete wetting thereof. This is significant since much of the green and cured strength is due to the fibers which provide cohesion to the composition. Thereafter the colloidal silica or glass microballoons are slowly added and mixed in. With the microballoons it is desirable to minimize the mixing time as much as possible without leaving "dry" particles so as to minimize crushing of the glass microballoons. By adding the bulky microballoons or colloidal silica last, slight adjustments in quantity can be made to accommodate unintentional variations in the other constitutents so that a paste of suitable viscosity is obtained. Mixing can be by hand or with a low speed paddle mixer or the like. Mixing is preferably conducted at room temperature.

In forming a honeycomb structure employing the core-filling and core-splicing compositions hereinabove described, the metallic surfaces are cleaned prior to assembly by conventional techniques. If stainless steel core is employed, conventional pickles are preferred for cleaning thereof. Beryllium facing sheets are readily cleaned by short-time immersion in room temperature 10 to 20 percent sulfuric acid solution followed by a brief neutralization at about 140° F. in five percent sodium hydroxide solution. If preferred, the beryllium surface can be cleaned in a conventional alkaline cleaner such as a buffered sodium hydroxide solution.

The face sheet 11 which may be formed to a contour as illustrated in FIG. 1, is placed in position on a mold or mandrel, and a thin layer of adhesive is placed over the face sheet. A suitable adhesive may comprise for example, a polybenzimidazole resin film on a scrim fabric of the type readily commercially available. The honeycomb core material 13 is then laid over the adhesive layer and if necessary, a core-splice is made.

In production of honeycomb parts it is desirable to employ a tacky adhesive system. As hereinabove mentioned, the polybenzimidazole resin is a solid and as employed herein is a film on a scrim fabric. In order to tackify this adhesive it is preferred to contact the surface with an organic solvent preferably dimethyl formamide which is conveniently done by spraying with a fine mist. It is also desirable to prime the faying surfaces before bonding and this is preferably accomplished by brushing, dipping or spraying the surfaces with a 50 percent solution of the aforementioned polybenzimidazole adhesive in dimethyl formamide. Heating to 250° F. evaporates a portion of the solvent and leaves a tacky surface.

A core splice is made by butting two pieces of honeycomb core material 13a and 13b closely together and filling the broken cells adjacent the splice with a viscous pasty material 15 such as hereinabove described. The material can be injected into the broken cells and intact cells adjacent the splice by automatic equipment or if small productions are involved, the core splice material may be injected with a hand-operated calking gun or the like, or may be pressed in place with a small spatula.

The edges of the honeycomb core are then reinforced by a honeycomb core fill material 14 as hereinabove described. This material is injected in the intact core cells adjacent the edges of the honeycomb core and pressed into the broken cells adjacent the edge. As hereinabove mentioned, this material may be injected by automatic equipment, a hand-operated calking gun, or may be applied with a small spatula. After the core-filling and splicing materials are in place and cured, another layer of adhesive is applied on a scrim fabric, as hereinabove mentioned, and the other facing sheet is applied over the assemblage. If desired, the edges of the honeycomb core can then be dressed with a spatula to assure smooth and even filling of the broken cells adjacent the edges of the honeycomb.

After the assembly of the core and core filling and core splicing materials and again after the second face sheet is applied, the cylinder is preferably contained in a vacuum bag or mounted in a platen press for curing in the conventional manner. Vacuum bagging is generally preferred for complex shaped parts and comprises enclosing the honeycomb sandwich structure in a flexible impermeable membrane for application of pressure thereto to assure intimate contact between the face sheet, adhesive and honeycomb core during curing of the adhesive. Suitable vacuum bagging materials for use with the polybenzimidazole resins herein involved include high temperature silicone rubbers such as Silastic 52 available from Dow Corning Company. The vacuum bag may be sealed with conventional zinc chromate putty or silicone calking compounds can be employed. Bleeder fabrics of Teflon or glass are readily employed and Teflon or other fluorocarbon films are useful for release films employed in the conventional manner of vacuum bag manufacturing technology. The curing cycles employed with polybenzimidazole resin are near the upper temperature limit for many of these vacuum bagging materials; however, it has been found that for the time intervals involved, the materials performed satisfactorily despite some thermal decomposition thereof. After a honeycomb assembly is enclosed in a vacuum bag it may be evacuated and enclosed in an autoclave for applying an appreciable pressure to the assemblage. It has been found that a pressure of about 35 p.s.i.g. is adequate for most bonding procedures.

In order to cure the polybenzimidazole resins they are preferably heated for from about 1 to 10 hours at about 600 to 650° F. The temperature is preferably raised relatively slowly so that the solvents in the core splicing and core filling materials have an opportunity to evaporate and be evacuated from the assemblage during heating. It is found that the presence of the solvents in the core filling and splicing materials causes some foaming thereof and thereby further reduces the density of the cured composite. The solvents are completely extracted in the curing process and at 600° F. the polybenzimidazole resins have been softened to the point that they wet the solid materials in the mixture and also wet the surface of the honeycomb core for adhesion thereto. After curing at about 600 to 650° F., a post-cure cycle is preferred in an inert atmosphere in order to obtain the full strength of the polybenzimidazole resin mixtures. A post-cure treatment comprises slowly heating the part to about 750° F. and holding for about one hour.

The materials provided in practice of this invention are useful in applications besides those hereinabove described. Thus, these materials can serve as high temperature thermal insulation, particularly compositions low in aluminum and high in hollow glass microspheres which results in a low thermal conductivity. The materials also are quite useful as ablative materials for withstanding high temperature aerodynamic erosions. The polybenzimidazole resin compositions provided herein have excellent resistance to high temperature, low thermal diffusivity, good thermal shock resistance and relatively high ablation energies. Many other applications of such materials can be readily recognized by one skilled in the art.

The following examfples are demonstrative of the application of the principles of this invention to a particular structure.

EXAMPLE I

Flat aluminum honeycomb sandwich structures were fabricated according to the principles of this invention. Aluminum honeycomb core was cleaned by dipping in methylene chloride for one minute followed by 30 minutes air drying. Two pieces of honeycomb core were employed and the edges of their abutment and cells parallel thereto were filled with a viscous paste comprising about 100 grams of polybenzimidazole resin, about 100 grams of 1–5 micron aluminum powder, about 10–15 grams of arsenic thioarsenate, about 80 milliliters of pyridine, about 45 grams of chopped glass fibers (mill fibers), and about 10 grams of colloidal silica. The honeycomb core with the paste filling along ½ inch of the two edges was placed on a layer of polybenzimidazole resin adhesive which was on an aluminum sheet. The assemblage was vacuum bagged and preheated to 200° F. for one hour. The temperature was then raised to 430° F. and held for one hour. The part was removed when cooled to 200° F. A second aluminum sheet was bonded to the honyecomb with a layer of polybenzimidazole resin adhesive and cured in the same manner to form a honeycomb structural sandwich. Observation of the properties of the sandwich confirmed the expectations and justified fabrication of a higher temperature cylindrical part.

EXAMPLE II

A cylinder 12 inches outside diameter and 14 inches long was fabricated according to the principles of this invention. The inner and outer face sheets of the cylinder comprised beryllium sheet 0.017 inch thick which were press-formed to the required curvature with matched metal dies at 1375° F. in inert atmosphere. The honeycomb core comprised Type 301 stainless steel foil, 0.002 inch thick, formed in a brazed honeycomb with one-quarter inch hexagonal honeycomb cells and a core thickness of about one-quarter inch. The stainless steel honeycomb core was cold rolled to the required curvature.

The stainless steel honeycomb core was cleaned by conventional degreasing and pickling and the beryllium sheets were cleaned in a conventional alkaline cleaner. Immediately after cleaning and drying, the faying or contact surfaces of the parts were brush-primed with a 50% solution of polybenzimidazole resin adhesive in dimethyl formamide. The parts were then dryed for one hour at 250° F. Such a treatment leaves the surfaces relatively tacky. The inner face sheet of the cylinder was assembled on a mandrel and included doublers at the splices between adjacent beryllium sheets, and a layer of polybenzimidazole resin adhesive on a scrim fabric was placed thereon. The polybenzimidazole resin adhesive was made tacky prior to use by spraying the surface with dimethyl formamide. The stainless steel honeycomb core was applied in two sections and spliced with a viscous paste comprising about 100 parts by weight of polybenzimidazole resin; about 100 parts by weight of aluminum powder; about 10 parts by weight of arsenic thioarsenate; about 78–79 parts by weight of pyridine; about 45 parts by weight of short glass fibers (mill fibers); and ten parts by weight of colloidal silica (Cab-O-Sil). The core splicing material was pressed in place with a small spatula into the broken cells and intact cells adjacent to the abutment of the two sections of honeycomb core.

Metal end rings were then provided at either end of the cylinder to prevent edge crushing of the core and the cylinder was vacuum bagged for curing. Teflon fabric strips were placed over the areas where the core splicing material was present and glass fabric was placed over the entire surface of the cylinder to permit bleeding of gases therefrom upon evacuation. A prefabricated silicone rubber sleeve was slipped over the entire mandrel and cylinder and sealed at both ends with a conventional zinc chromate putty and a silicone calking compound. A vacuum of 25 inches of mercury was drawn in the vacuum bag and maintained during the curing cycle. The vacuum bag assemblage was slowly heated to 430° F. and held for one hour under vacuum to completely remove solvents and then slowly heated to 600° F. with an augmented pressure of 30 p.s.i. in an autoclave. The part was held at 600° F. for one hour and slowly cooled with the autoclave pressure released after the part had cooled to about 150° F.

After the vacuum bag was removed the outer face sheet parts were assembled on the cylinder with doublers at spaces between beryllium sheets. The edges of the core 2 or 2½ cells deep were hand filled with the core-filling material. The core-filling composition comprised 100 parts by weight polybenzimidazole resin; about 100 parts by weight of aluminum powder; about 10 parts by weight of arsenic thioarsenate; about 93 to 94 parts by weight of pyridine; about 20 parts by weight of short glass fibers (mill fibers); and about 25 parts by weight of glass microballoons (Glob-O-Sil).

A layer of polybenzimidazole resin adhesive tackified by spraying with a fine mist of dimethyl formamide was placed over the honeycomb core and the outer face sheet of beryllium placed thereover. The cylindrical assemblage was then again fitted and sealed within the silicone rubber sleeve and cured as hereinabove described.

After curing, one-eighth inch diameter holes were drilled into the honeycomb core edge fill material, approximately four inches on centers, to provide venting of the interior of the honeycomb core. The cylinders were then enclosed in a rigid steel retort and evacuated and purged with argon several times to minimize the possibility of oxidation of the parts. The cylinder was then heated slowly to 750° F. and held for about one hour. After cooling to about 150° F. the cylinder was removed from the retort and subjected to mechanical testing.

Another cylinder of the same dimensions was fabricated employing Type 301 stainless steel 0.020 inch thick for the facing sheets, and a honeycomb core of PH15–7Mo stainless steel core. This core was foil gauge 0.002 inch stainless steel with one-quarter inch hexagon cells and was about one-quarter inch thick. The fabrication techniques and materials were the same as hereinabove described for construction of a cylinder having beryllium face sheets and stainless steel cores. Both cylinders were loaded in axial compression as high as 40,000 pounds at room temperature and 30,000 pounds at 800° F. and at intermediate loads at intermediate temperatures. A load as high as 35,700 pounds was applied to the all stainless steel cylinder at 800° F. without failure. No defects in the basic cylinder could be located after this testing procedure, thereby demonstrating that the adhesive bonding, core-splicing and edge-filling were satisfactory at elevated temperature. After the elevated temperature test, one cylinder was loaded to 60,000 pounds at room temperature without evidence of failure.

Although this invention has been described and illustrated in detail, it is to be understood that the same is by way of illustration and example only and is not to be taken by way of limitation.

What is claimed is:
1. An article of manufacture comprising:
a first face sheet made of beryllium;
a second face sheet made of beryllium;
a honeycomb core made of a metal from the class consisting of aluminum and stainless steel, said core being bonded between said face sheets, and said honeycomb core including a joint wherein two edges of honeycomb core are butted together;
both of said face sheets overlapping said joint; and
a heat-cured, structural material disposed in said joint and around the exposed edges of said honeycomb;
said material for the core edges comprising;
about 100 parts by weight of a polybenzimidazole resin;
from about 85 to 110 parts by weight of a material selected from the class consisting of pyridine, dimethyl sulfoxide, N,N-dimethyl formamide, and N-methyl, 2, pyrrolidone;
from about 15 to 25 parts by weight of short glass mill fibers for producing a cohesive paste;
from about 50 to 150 parts by weight of aluminum powder;
from about 10 to 50 parts by weight of arsenic thioarsenate; and
from 20 to 30 parts by weight of hollow glass microspheres to produce a viscous paste; and
said material for said joint comprising:
about 100 parts by weight of polybenzimidazole resin,
from about 65 to 100 parts by weight of a material selected from the class consisting of pyridine, dimethyl sulfoxide, N,N-dimethyl formamide, and N-methyl, 2, pyrrolidone,
from about 35 to 60 parts by weight of glass mill fibers,
from about 50 to 150 parts by weight of aluminum powder, from about 10 to 50 parts by weight of arsenic thio-arsenate, and
from about 9.5 to 10.5 parts by weight of colloidal silica to form a viscous paste.

References Cited
UNITED STATES PATENTS

| | | | |
|---|---|---|---|
| 2,669,860 | 2/1954 | Bell | 161—68X |
| 3,210,233 | 10/1965 | Kummer et al. | 161—68 |
| 3,230,184 | 1/1966 | Alford | 260—2.5 |
| 3,287,311 | 11/1966 | Edwards | 260—37 |
| 3,386,969 | 6/1968 | Levine | 260—37X |
| 3,416,994 | 12/1968 | Chalmers et al. | 156—331X |

FOREIGN PATENTS

| | | | |
|---|---|---|---|
| 456,037 | 4/1949 | Canada | 161—68 |

OTHER REFERENCES

Levine, H. H., "Heteromatic Structural Adhesives," Paper No. V–1, 9th Symposium, Society of Aerospace Material and Process Engineers, November 1965, pp. 1, 2, 3, 4, 9, 11, 29, 30, 31, 42, 43 and Table 5.

Hill, J. R., "Process Development of Polybenzimidazole Adhesives," Paper No. V–2, 9th Symposium, Soc. Aerosp. Mat. and Proc. Eng., November 1965, pp. 1 and 12.

JOHN T. GOOLKASIAN, Primary Examiner

J. C. GILL, Assistant Examiner

U.S. Cl. X.R.

156—304, 331; 260—30.2, 30.8, 32.4, 32.6, 37, 78.4; 161—36